(12) United States Patent
DeBusk et al.

(10) Patent No.: US 6,692,641 B2
(45) Date of Patent: Feb. 17, 2004

(54) ALGAL AND NUTRIENT CONTROL METHOD FOR A BODY OF WATER

(76) Inventors: Thomas A. DeBusk, 3208 Westchester Dr., Cocoa, FL (US) 32926; David L. Haselow, 2825 Friday La., Cocoa, FL (US) 32926

( * ) Notice: Subject to any disclaimer, the term of this patent is extended or adjusted under 35 U.S.C. 154(b) by 0 days.

(21) Appl. No.: 10/360,667

(22) Filed: Feb. 6, 2003

(65) Prior Publication Data

US 2003/0116502 A1 Jun. 26, 2003

Related U.S. Application Data

(63) Continuation-in-part of application No. 10/187,910, filed on Jul. 1, 2002, which is a continuation of application No. 09/929,970, filed on Aug. 15, 2001, now Pat. No. 6,413,426.
(60) Provisional application No. 60/227,559, filed on Aug. 23, 2000.

(51) Int. Cl.[7] .................................................. C02F 3/00
(52) U.S. Cl. ................. 210/602; 210/610; 210/620; 210/631; 210/702; 210/723; 210/724; 210/743; 210/758; 210/906
(58) Field of Search ........................ 210/602, 610, 210/620, 631, 702, 723, 724, 743, 758, 906

(56) References Cited

U.S. PATENT DOCUMENTS 5,766,474 A  6/1998  Smith et al.

OTHER PUBLICATIONS

Lake Apopka Water Hyacinth Demonstration Project, Second Semi–Annual Report prepared for St. Johns River Water Management District, prepared by Amasek, Inc., Apr. 4, 1991.

Debusk et al., "Effectiveness of Mechanical Aeration in Floating Aquatic Macrophyte–Based Wastewater Treatment Systems," Journal of Environmental Quality, vol. 18, No. 3, pps. 349–354, Jul.–Sep. 1989.

Clark, Mark, "Biophysical Characterization of Floating Wetlands (Flotant) and Vegetative Succession of a Warm–Temperature Aquatic Ecosystem," Dissertation, University of Florida 2000.

Wen, Li and Recknagel, Friedrich, "In Situ Removal of Dissolved Phosphorus in Irrigation Drainage Water by Planted Floats: Preliminary Results from Growth Chamber Experiment," Agriculture, Ecosystems and Environment, vol. 90, pp. 9–15, Jun. 2002.

Youngchul, Kim and Wan–Joong, Kim, "Roles of Water Hyacinths and Their Roots for Reducing Algal Concentration in the Effluent from Waste Stabilization Ponds," Water Research, vol. 34, No. 13, pps. 3285–3294, Sep. 1, 2002.

Primary Examiner—Chester T. Barry
(74) Attorney, Agent, or Firm—Allen, Dyer, Doppelt, Milbrath & Gilchrist, P.A.

(57) ABSTRACT

A system to control nutrients, suspended algae, and filamentous algae in lakes, ponds, and estuaries includes a structure for containing macrophytic vegetation. One embodiment segregates a column of water within a body of water desired for remediation and shields the water column from sunlight sufficiently to kill phytoplankton therein, the lysis thereof releasing nutrients. The released nutrients are sequestered, and remediated water is replaced in the water column with water from the body of water. Floating or submerged macrophytes can be introduced in combination with shading and induced water movement to optimize nutrient uptake by the macrophytes. Water column shading may also be achieved by the macrophytes themselves, or by other means. The macrophytes can include floating aquatic plants, such as water hyacinths, submerged aquatic plants, and terrestrial or aquatic plants caused to float artificially. The invention also deals with toxic algae in a safe and sequestered way.

27 Claims, 7 Drawing Sheets

ELEVATION

ALGAL AND NUTRIENT CONTROL METHOD FOR A BODY OF WATER

CROSS-REFERENCE TO RELATED APPLICATIONS

This application is a continuation-in-part of and claims priority from application Ser. No. 10/187,410, filed Jul. 1, 2002, which is a continuation of and claims priority to application Ser. No. 09/929,970, filed Aug. 15, 2001, "Algal and Nutrient Control System and Method for a Body of Water," now issued U.S. Pat. No. 6,413,426, which itself claims priority from provisional application Ser. No. 60/227,559, "Macrophyte System and Method for Algae and Nutrient Control in a Body of Water," filed Aug. 23, 2000, all of which are commonly owned with the present invention and which are incorporated herein by reference.

BACKGROUND OF THE INVENTION

1. Field of the Invention

The present invention relates to systems and methods of water purification, and, more particularly, the control of nutrients, suspended and filamentous algae, pollutants, and toxins in water.

2. Description of Related Art

Many freshwater lakes and ponds, as well as estuaries, are characterized, particularly during the warmer months, by a significant population of suspended algae or phytoplankton in the water body's water column. These largely unicellular plants give the water a greenish and often a "pea-soup" appearance that many observers find unattractive. Floating mats of unsightly, filamentous algae also can occur. High concentrations of algae may lead to low levels of dissolved oxygen in the early morning hours, leading to stress on the aquatic and fish populations. In extreme cases, these conditions will lead to fish kills and the general decline of the quality of a water body.

The basis of the problem is an abundance of soluble nutrients within the water body, which then allows the rapid growth and maintenance of the elevated population of suspended or filamentous algae. The source of the soluble nutrients may be sediments, air deposition, point source polluting discharges, generalized, non-point-source inflows, or most likely a combination of all these factors. An effective management strategy would combine elements of attempting to reduce nutrient loading to the water body with treatment of the water body itself.

Currently used methods of controlling algal growth in ponds or lakes typically involve treating the water with selected herbicides or "algicides." These chemicals kill the suspended algae, returning the water to its more desired appearance of clear or only slightly colored waters. Alternatively, a water body may be treated with various aluminum salts (e.g., aluminum sulfate), which achieves a similar result through a chemical precipitation reaction. Another strategy employed in managing algae is to introduce a dye that then, via the mechanism of shading, achieves the same result of killing the algae and returning the water to its algae-free appearance.

Another problem with these approaches is that the underlying feature that initially encouraged the growth of the algae remains; that is, the nutrients on which the algae grew remain in the water, and after the effects of the algicide, herbicide, or dye decrease, the conditions for a renewed growth of algae are abundantly present. In addition, for the algicide and herbicide at least, the negative environmental effects of potentially toxic accumulation must be considered. In the case of aluminum salts, a temporary reduction in selected nutrients (e.g., phosphorus) is effected, but considerable skill and expertise are required to effectively and efficiently precipitate the suspended (nutrient-containing) solids.

An alternative strategy to killing the algae and then creating relatively clear but nutrient-rich water body is to cause a release of nutrients from the algae but then to remove these nutrients from the water body. A natural method of achieving this nutrient removal is through the harvesting of macrophyte vegetation, which takes up the soluble nutrients as a function of their growth. If the total mass of nutrients removed through plant harvest were to match the ongoing nutrient loading through the various sources of sediment transport, air deposition point and nonpoint sources, then the lake or pond would be able to maintain an algal-free appearance.

Shading of the suspended algae-containing water is one means to achieve algal cell lysis and an increase in the proportion of nitrogen and phosphorus in the water column that is biologically available for other plant growth. The use of shading to cause a release of soluble nutrients has been investigated and taken advantage of in the prior art.

Reddy and DeBusk (1987) determined in a short-term mesocosm-scale experiment that the primary nutrient removal mechanism in a water hyacinth system that received phytoplankton-laden lake water was the settling of algal cells.

The sustainable removal of nutrients, however, involves not just shading and subsequent plant uptake and plant harvest. Many macrophytes, such as the floating water hyacinths orsubmerged macrophytes, are characterized by much highergrowth rates than can be adequately sustained by the amount of nutrients held by a water column beneath them. Reddy et al. (1983) concluded that the high levels of floating water hyacinth biomass in a central Florida lake could be sustained only by transport of nutrients from the sediments and detritus or by fixation (in the case of nitrogen) from the atmosphere.

A particular model of a system for decreasing algal concentration consists of macrophyte vegetation (plants) and various permutations of floating boom, barrier, and water control mechanisms (pumps, internal barriers, etc.) for sequentially shading suspended algae-containing water. The shading causes the algae to lyse and release contained nutrients, which then promotes the growth of a standing crop of either subsurface (submerged) or floating vegetation. Depending on the configuration desired, the plants are periodically harvested from the containment system, effectively removing soluble nutrients such as phosphorus and nitrogen from the pond, estuary, or lake. In the case of submerged macrophytes, water chemistry changes caused by their photosynthetic activity can further contribute to nutrient removal (e.g., co-precipitation of phosphorus with calcium carbonate) beyond that achieved by plant harvest. As the overall total level of nutrients within the water column decreases, the conditions favorable to sustained nuisance algal growth diminish, and further algal growth is discouraged.

Therefore, to encourage further plant growth and hence continued removal of suspended and filamentous algae, it is believed desirable that the water beneath the macrophyte vegetation, whether held within a barrier or not, be exchanged with new nutrient-bearing water.

Another site of contaminated water is the so-called "waste stabilization pond" (WSP), a body of water used to store industrial, municipal, agricultural wastewater or contaminated groundwater. The WSP is believed to be the most prevalent type of wastewater treatment technology in the world.

SUMMARY OF THE INVENTION

The system and method of the present invention is directed to the management and control of suspended and filamentous algae, excess nutrients, hydrocarbons, pathogens, and other contaminants in fresh water bodies and estuaries, including natural and manmade bodies of water such as waste stabilization ponds. A plurality of embodiments are contemplated, a best mode among which is dependent upon the characteristics of each specific body of water, as determinable by measurements of water chemistry, algal decomposition rates, and contaminant type and level.

A method of the present invention for reducing a contaminant level in a body of water comprises the steps of placing plants atop at least a portion of the body of water. The plants are positioned to shield the water column from sunlight sufficiently to kill phytoplankton therein, the lysis of which releases nutrients, at least a portion of which is sequestered by the plants. A microbial colonization of a rhizosphere area (root zone) of the plants is permitted for achieving microbially mediated contaminant removal and transformation. The microbes can work to degrade hydrocarbons, and water-borne pathogens may be consumed by root-zone biota, for example. In addition, the microbial population may mediate a transformation of ammonia nitrogen to nitrate nitrogen to nitrogen gas.

In a system for reducing a contaminant level, the plants comprise a floating mat of plants placed atop at least a portion of the body of water. The floating mat serves two functions: It alters the underlying water column environment by shading; and it provides a high-surface-area attachment site, the roots and root hairs, for microbes to colonize. It is believed that the rhizosphere can harbor a complex array of microorganisms that proliferate on attachment sites and rely on inorganic and organic exudates (e.g., organic compounds and enzymes) from the plant roots to support their physiological processes. The present inventors have shown, for example, that for some aquatic plant species there exists significant oxygen transfer from the plant shoots to the roots, thereby facilitating aerobic microbial respiration in the root zone.

Another embodiment is a method comprising the steps of segregating a column of water within a body of water having excess phytoplankton and nutrients therein and shielding the water column from sunlight sufficiently to kill phytoplankton therein, the lysis thereof releasing nutrients. Next the released nutrients are sequestered, and remediated water is replaced in the water column with water from the body of water.

In some embodiments, floating or submerged macrophytes are introduced into a body of water in combination with water column shading and induced water movement to optimize nutrient uptake by the macrophytes. Water column shading may also be achieved by the macrophytes themselves. The macrophytes can include aquatic plants that float on their own, such as water hyacinths, submerged aquatic plants, and terrestrial or aquatic plants caused to float by artificial means.

Another developing problem in bodies of fresh water is the presence of toxic algae. At present copper is added to the water to kill the toxic algae, but the difficulty is that this releases the toxins into the water.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1–8.

In a first embodiment (FIGS. 1A and 1B), the system 10 comprises means for shading 11 a first section 91 of a body of water 90. The shading means may comprise, for example, floating balls, shade cloth, or opaque fabric, etc., although these are not intended as a limitation. A second section 92 of the body of water 90 contains macrophytes 12. The macrophytes 12 may comprise either or both of a floating or submerged variety. Exemplary macrophytes 12 include floating wetland plants, such as, but not intended to be limited to, Hydrocotyle, Limnobium, Eichhornia, and Scirpus. In this embodiment the first section 91 is larger than the second section 92.

Figure 1A:
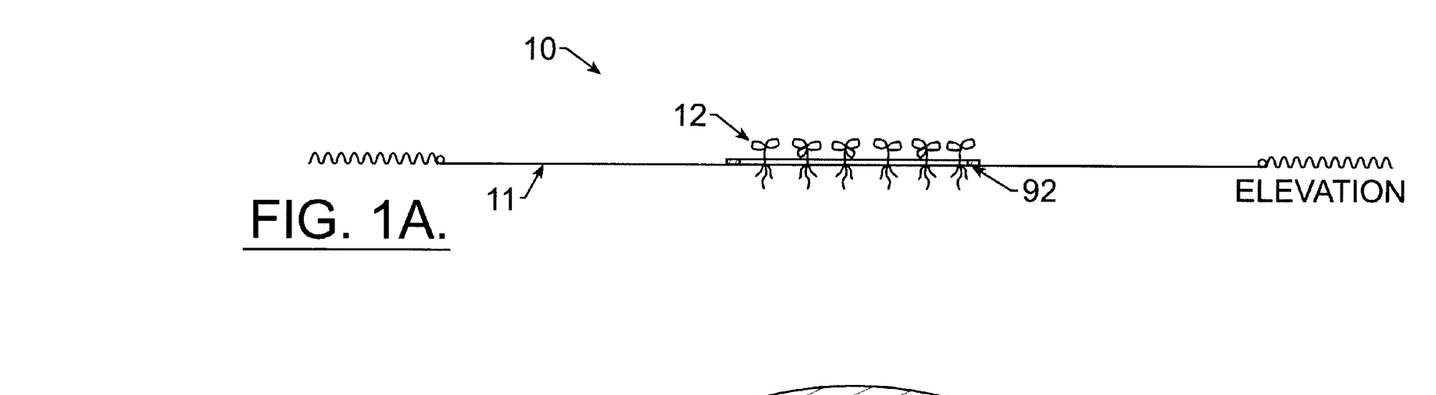
FIGS. 1A and 1B are, respectively, elevation and top plan views of a first embodiment of the system of the present invention.
Figure 1B:
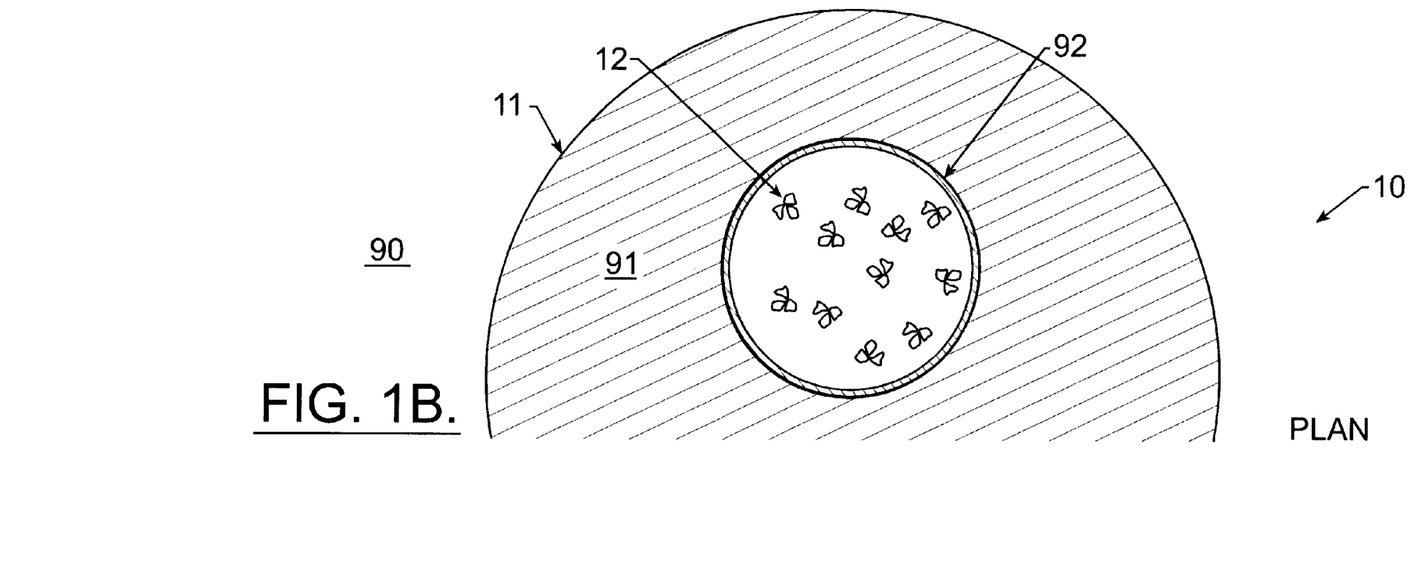
Figure 2A:
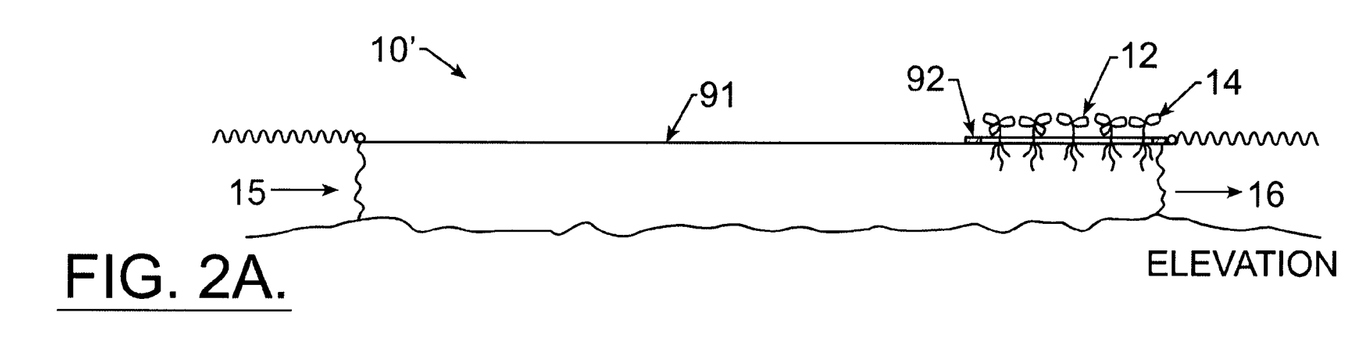
FIGS. 2A and 2B are, respectively, elevation and top plan views of a second embodiment of the system.
Figure 2B:
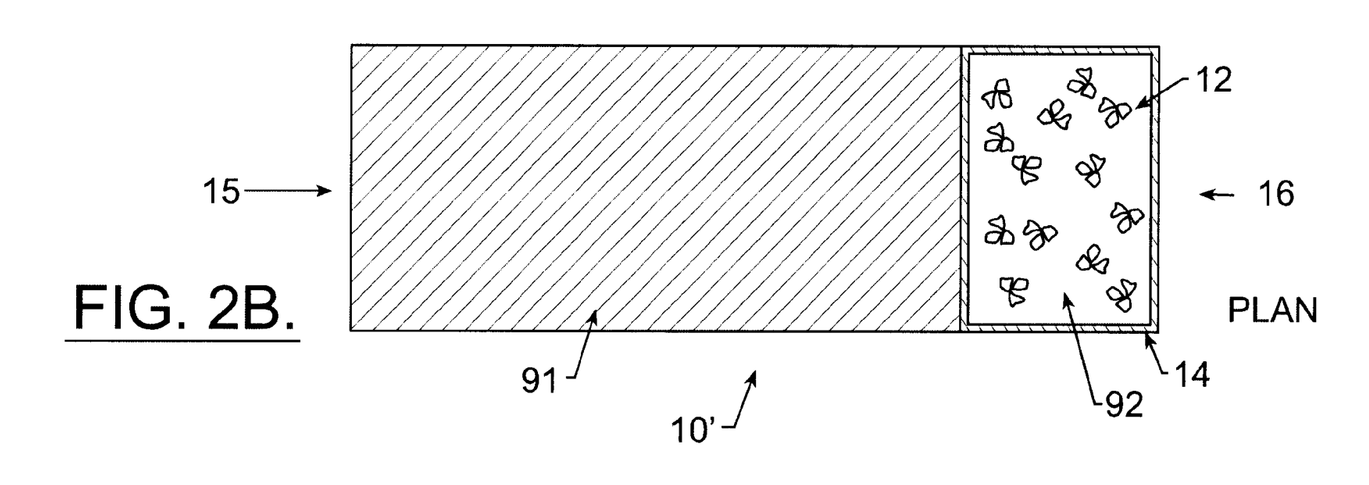

In one configuration, the shaded area 91 is equicentric with boomed floating or submerged plants 12, providing for a detention time by the water under the shading and a subsequent detention time in the proximity of the floating or submerged plants 12. In this way, as the water moves under the shade 11, it is shaded and subsequently the nutrients released by dying algae are taken up by the macrophytes 12.

In a second embodiment 10' (FIGS. 2A and 2B), a floating boom 14 containing macrophytes 12 is not circular but instead rectangular, wherein the water enters one end 15, is shaded (causing nutrient release) under the shaded area 91, and then moves into the area 92 containing the macrophytes 12, and exits the other end 16.

In a third embodiment 10" (FIGS. 3A and 3B), a barrier 17, such as a "skirt," extends from the surface 93 to the bottom 94 and is affixed to a floating boom 14 containing the macrophytes 12 at its top edge. Preferably the barrier 17 is weighted at the bottom edge to ensure that water exchange between the interior and the exterior of the enclosure is minimized. Means are provided for controlling the ingress and egress of water to this now-separated water column. The control of the water exchange can be effected by a pump 18, deployed under the water surface 93 and adjacent the barrier 17. The egress of the water is effected by the pressure differential created by the ingress pump 18 and is made through an egress vent 21 in another portion of the barrier 17. Any of the pumps discussed in the present invention may comprise a solar-powered pump.

Figure 3A:
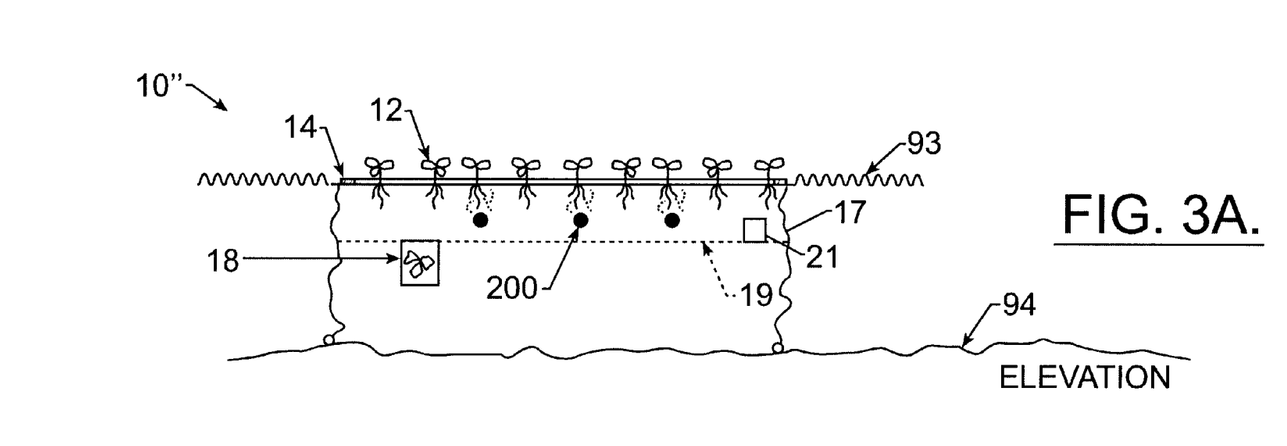
FIGS. 3A and 3B are, respectively, elevation and top plan views of a third embodiment of the system.
Figure 3B:
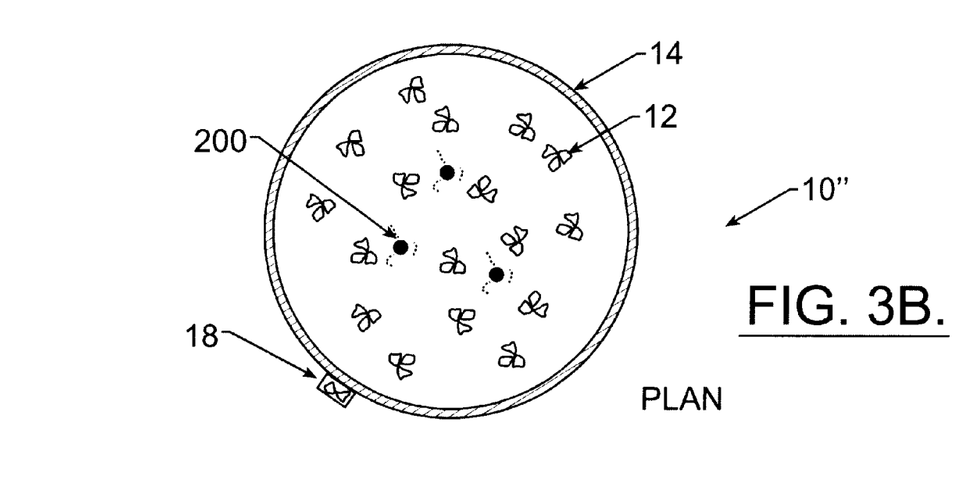

It should be noted that the depth of the pump 18 intake is a variable of the process, and can be determined based upon system parameters, such as, but not intended to be limited to, the type of contaminant desired to be removed. For example, in order to maximize the concentration and load of hydrocarbons into the enclosure, the pump intake would be positioned adjacent the water surface 93, since most hydrocarbons float. On the other hand, in order to maximize the concentration and load of phytoplankton, the pump intake would be positioned just below the water surface 93. However, to minimize phytoplankton input, while simultaneously maximizing input of sediment-related nutrients, the pump intake would be positioned just above the sediment-water interface. In addition, pumping into the enclosure only at certain times (e.g., day vs. night) can be used as a strategy to maximize or minimize phytoplankton input.

Another variable parameter is pumping rate into the enclosure, which can be varied overtime, depending upon the "successional" state of the plants 12 in the enclosure (e.g., initial colonization vs. a mature vegetative mat), as well as the pollutant removal goals. Observation of the health of the floating mat, as well as water chemistry measurements of pollutant removal effectiveness, or measurements that provide indirect evidence of performance, such as pH and dissolved oxygen concentrations, can be used to determine an optimal pumping rate and intake location.

Another example of temporal variation in pumping is related to long-term pollutant removal effectiveness of the system. In many instances, the water being pumped into the enclosure immediately upon deployment contains high concentrations of phytoplankton and/or pollutants. The pumping rate therefore can be slow, yet provide an acceptable pollutant loading to the enclosure. Overtime, as the enclosure system begins to clear the water body, the phytoplankton and pollutant concentrations (and, hence, the load at a given pumping rate) will decline. Then the pumping rate can gradually increase to compensate for this gradual temporal concentration reduction. One of skill in the art will recognize that other operational issues, such as desired hydraulic retention time in the enclosure, must be considered in selecting a pumping rate. For example, such variables can be used to maintain a substantially constant pollutant loading to the enclosure.

Preferably the water exchange rate through the water column beneath the macrophytes 12, which form a floating mat, can be adjusted not only to the rate of phytoplankton release of nutrients, but also to some other beneficial process that facilitates contaminant removal. An example is water column pH, which is more circumneutral beneath the mat than in the remaining portion of the body of water 90. A circumneutral pH is beneficial for phosphorus removal with an addition, for example, of a coagulant such as aluminum sulfate. An aluminum sulfate dose for phosphorus coagulation is related to pH, with higher pH levels requiring a higher dose. Thus water exchange can be adjusted to achieve optimal pH conditions to minimize coagulant dosage. Other environmental conditions can be achieved in the water column to enhance the use of other chemical coagulants, such as, but not intended to be limited to, calcium and iron compounds.

Segregation of the water column can also permit the addition of a nutrient in which the water is deficient. Further, if the water to be treated contains a potentially toxic constituent, the water entry rate can be adjusted (i.e., slowed) to a rate so that neither macrophyte growth nor root zone microbial activity is impaired by the toxic constituent.

Initial colonization typically is accomplished with floating macrophytes. After the floating macrophytes form a dense mat, the mat 12 may be seeded with seeds or vegetative propagules of different wetland or terrestrial plant species. The plant species may be chosen based upon number of criteria such as appearance, hardiness, or performance. Vegetation harvesting or herbicides can be used on the mat 12, as needed, to control "weedy," undesirable species, or to prevent the mat 12 from getting too thick and unwieldy. Harvesting also accomplishes nutrient removal.

An exemplary mat 12 may have a range of sizes.

In this embodiment, in which the barrier 17 extends from the floating boom 14 to the bottom 94 is used, an internal structure or baffle 19 can also be used to cause serpentine flow patterns within the barrier structure 17 is used. Such a structure has no appreciable effect on the detention time of the enclosed water (which would be determined by the pumping rate at the ingress structure), but is believed to serve to enhance settling of suspended algae by creating zones of lower water velocities.

A fourth embodiment and subembodiments thereof (FIGS. 4A and 4B) is believed at present to represent the best mode of practicing the invention. In this embodiment, a system and method for reducing a population of phytoplankton 20 and excess nutrient level in a body of water 32 comprises means for segregating a column of water 31 within the body of water 32 having excess phytoplankton 20 and nutrients therein. In one subembodiment 30 the segregating means comprises an enclosure 33 extending from a surface 93 to a bottom 94 of the body of water 32, as, for example, in FIGS. 4A and 4B. Although this embodiment 30 is shown as substantially cylindrical, this is not intended as a limitation, and other shapes may be contemplated within the scope of the present invention. The enclosure 33 comprises a material impermeable to water passage and has floats 34 attached to a top edge 35 of the enclosure 33 on the water body surface 93 and further has weights 36 attached to a bottom edge 37 for retaining the bottom edge 37 adjacent the water body bottom 94.

Figure 4A:
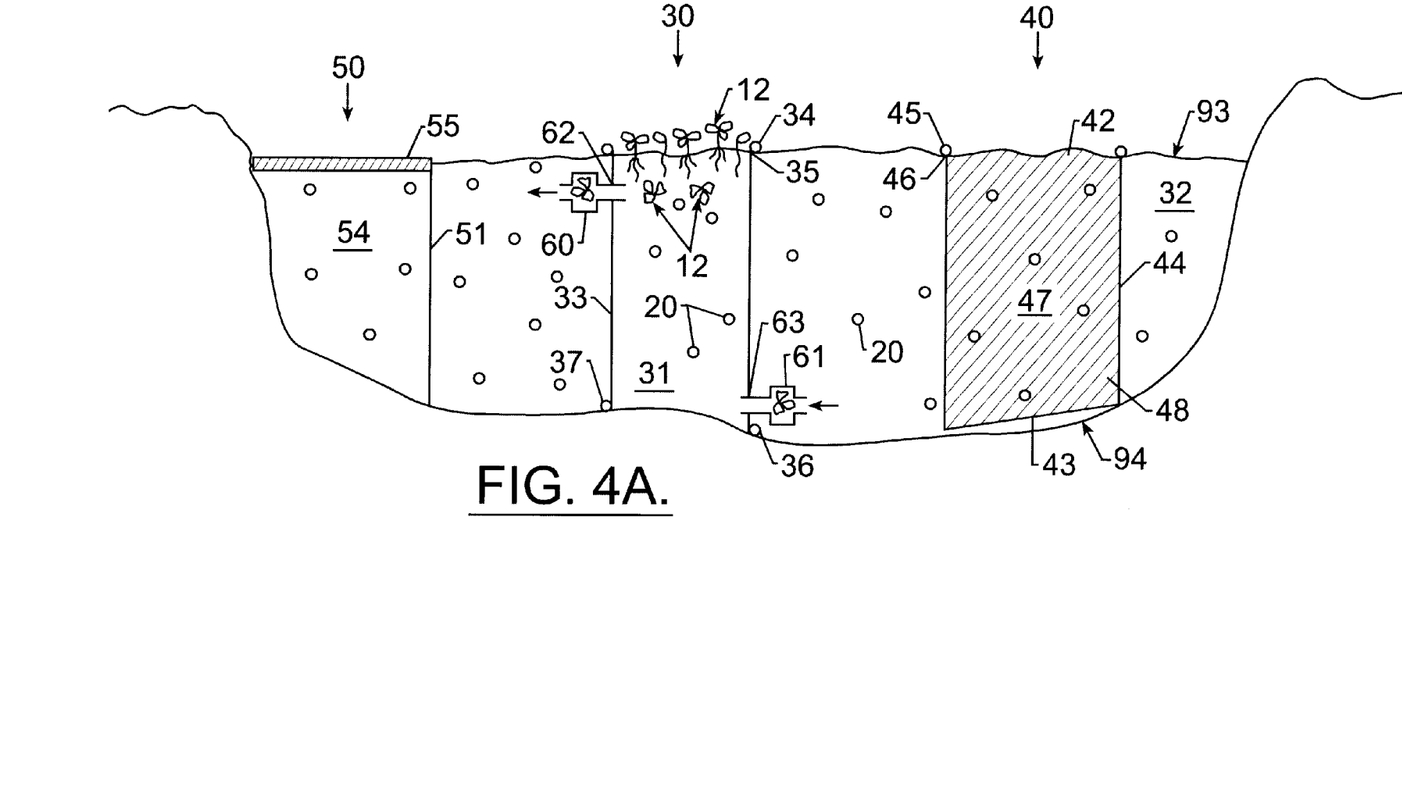
FIGS. 4A and 4B represent several embodiments of a fourth embodiment of the system, with FIGS. 4A and 4B illustrating cross-sectional and plan views, respectively, of systems having a single wall enclosure in the body of water, an enclosure having an enclosed bottom, and a partition separating out the water column from a portion of the shore.
Figure 4B:
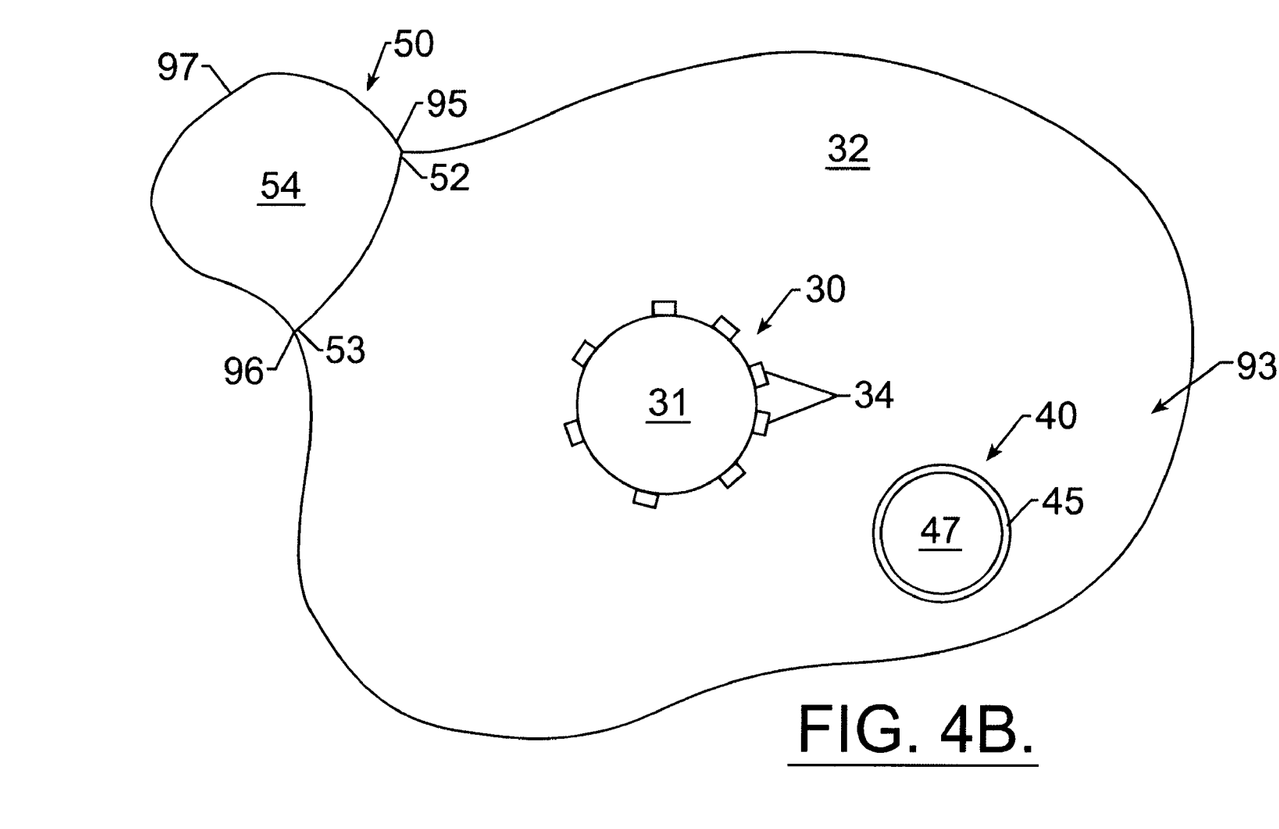
Figure 5A:
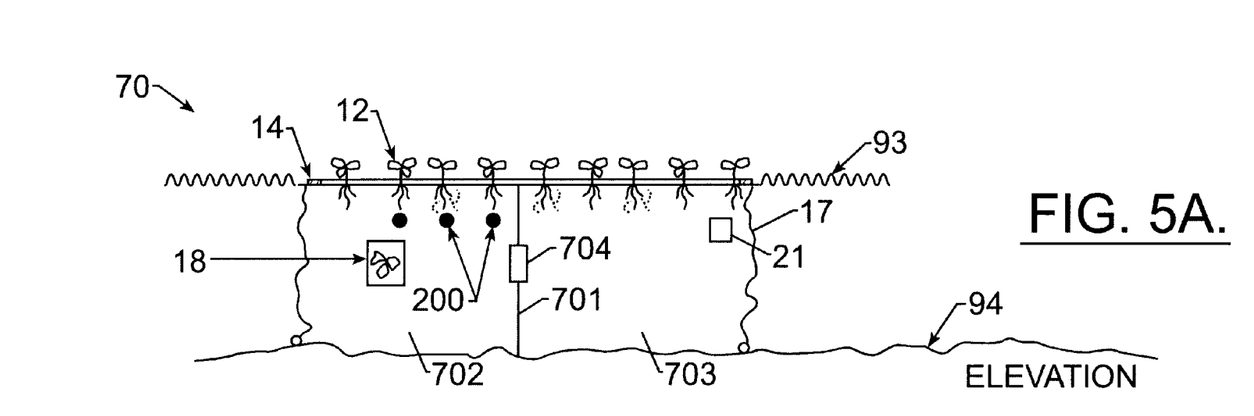
FIGS. 5A and 5B are, respectively, elevation and top plan views of a horizontally compartmentalized system.
Figure 5B:
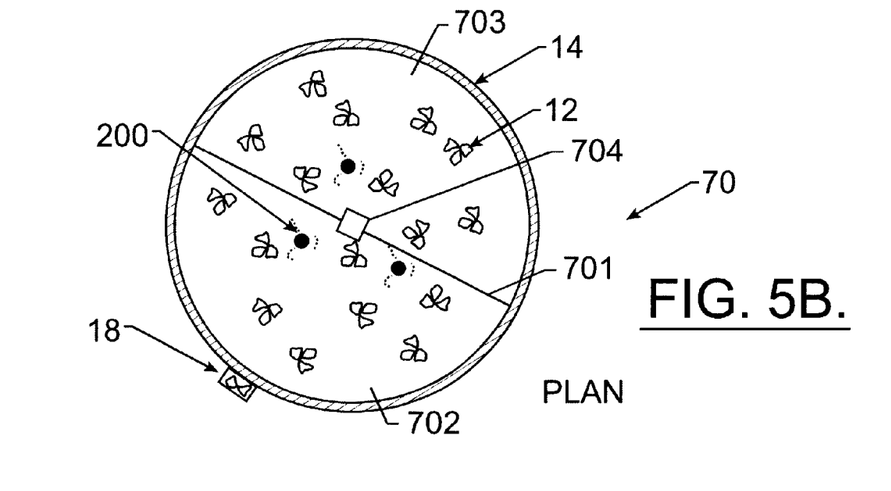

In a second subembodiment 40, also shown in FIGS. 4A and 4B, the segregating means comprises a water-impervious enclosure 41 that is insertable into the water body 32. The enclosure 41 comprises an open top 42, an enclosed bottom 43, a wall 44 affixed to the bottom 43 and extending upwardly therefrom, and a float 45 attached to a top edge 46 of the wall 44. The enclosure 41 therefore creates a water column 47 therewithin.

In a third subembodiment 50, also shown in FIGS. 4A and 4B, the segregating means comprises a partition that is droppable from the surface 93 to the bottom 94 of the body of water 32. The partition comprises a wall 51 that extends laterally from a first edge 52 that is anchorable against a first location 95 along an edge of the water body 32 and a second edge 53 that is anchorable against a second location 96 along the water body's edge in spaced relation from the first location 95. This partition 51 thereby creates a water column 54 that is enclosed by the partition wall 51 and the water body edge 97 between the first 95 and the second 96 location.

In an alternate embodiment to the third subembodiment 50, particularly useful in a shallow body of water or a shallow portion of a body of water, the partition comprises a row of tall and deeply extending plants, such as a row of bulrushes or cattails, which will hold the macrophytes in place and substantially prevent rapid water exchange therethrough.

The system further comprises a cover for shielding at least a portion of the water column from sunlight, for killing phytoplankton 20 therein, which need sunlight to survive. Killing the phytoplankton 20 is believed to be a requirement for excess nutrient removal, since the phytoplankton 20 typically outcompete the macrophytes 12 for the nutrients in the water. The lysis of the phytoplankton 20 releases nutrients therefrom. In the first subembodiment 30, the cover comprises a plurality of floating or submerged macrophytes 12 placed within the water column 31. The macrophytes, as described above, have an ability to take up released nutrients from the lysed phytoplankton. This subembodiment further comprises means for periodically harvesting the macrophytes 12 to reduce an excess population thereof. Such harvesting means are well known in the art, and may comprise commercial harvesting devices, for example.

In the second subembodiment 40, the cover comprises a sunlight-reducing dye 48 addable into the water column 47.

In the third subembodiment 50, the cover comprises a mixture 55 comprising a sunlight-reducing dye and a liquid immiscible with and lighter than water, the mixture floatable atop the water column 54. In other embodiments, the cover comprises a shading material 11 such as shown in FIGS. 1A and 1B that is placeable atop at least a portion of the water column.

The system additionally comprises means for sequestering the released nutrients, which in the first subembodiment comprises the macrophytes, floating 12 or submerged 12'.

The system also comprises means for replacing remediated water in the water column with water from the body of water. Typically the remediated water replacing means comprises a pump for removing water from the water column and for adding water from the water body into the water column. Preferably, as shown in FIG. 4A for the first subembodiment 30, the pump comprises a first pump 60 that is positioned at a first location 62 in the enclosure 33. The first pump 60 is for removing water from the water column 31 and returning the remediated water into the water body 32. A second pump 61 is for adding water into the water column 31 from the water body 32. The second pump 61 is positioned at a second location 63 in the enclosure 33 that is lower along the water column 31 than the first location 62. Further, the first pump 60 is in laterally spaced relation from the second pump 61. Preferably the first 60 and the second 61 pumps have a pumping rate adapted to effect a steady-state between water remediation and addition of water from the water body 32. One of skill in the art will recognize that each body of water and its components will have its own characteristics, and that the phytoplankton kill rate may vary over as much as an order of magnitude from site to site, and also depending on the amount and quality of shading, and the size and depth of the water column.

The system in other embodiments may also further comprise a coagulant that can be added to the water column to compact lysed phytoplankton at a bottom of the water column. The coagulant may comprise, for example, an aluminum compound such as aluminum chloride, which also sequesters phosphorus in the water column.

The system may also comprise means for removing lysed phytoplankton from the water column, such as a pump for removing a viscous bottom layer from the water column.

It should be noted that the fourth embodiments of the invention are ideally suited for removing toxic algae without exposing the rest of the body of water to released toxins, since the toxins remain in the water column and are not released into the water body as a whole. A copper compound can be used as known in the art, also without exposing the water body as a whole to the copper.

In all embodiments means for providing aeration may be included. Aeration may be introduced, for example, via one or more fine diffusers 200 (e.g., large air stones) that are deployed at various depths and locations within the system. The purpose of the aeration is to encourage lateral and vertical mixing (as constrained by the other goal of allowing algal biomass settling), and under certain circumstances, to encourage (accelerate) decomposition of the settled algal particles. In addition, because of the potential high density of microbes in the rhizosphere area, diffuse aeration beneath the root zone can stimulate contaminant breakdown. Either continuous or intermittent aeration can be used to accelerate breakdown contaminants such as simple and complex hydrocarbons.

One method of operating the system includes alternating cycles of aeration and non-aeration. When diffuse aeration is not provided, portions of the rhizosphere become anoxic or anaerobic. Under such conditions, contaminant removal mechanisms such as denitrification, the conversion of nitrate to nitrogen gas, occurs. Hence, by providing aeration within the enclosure on a cyclical basis, substantially complete removal of the ammonia nitrogen liberated by the senescing phytoplankton, via sequential nitrification and denitrification reactions, can be achieved. Other contaminants, such as selected pesticides, are also effectively broken down as microbial communities in the root zone are exposed sequentially to oxic and anoxic conditions.

In another alternate embodiment an electron acceptor other than oxygen (such as sulfate) can be added to encourage algal decomposition (and nutrient release). Additionally or alternatively, electron donors may be added, such as organic matter, to the bottom of an enclosure to create oxidation-reduction conditions amenable to nutrient release.

In the embodiment 10" of FIGS. 3A and 3B, means may also be provided for exposing the algae in the pumped "ingress" water to some sort of physical or chemical perturbation to accelerate their lysis and nutrient release within the enclosure.

Figure 6:
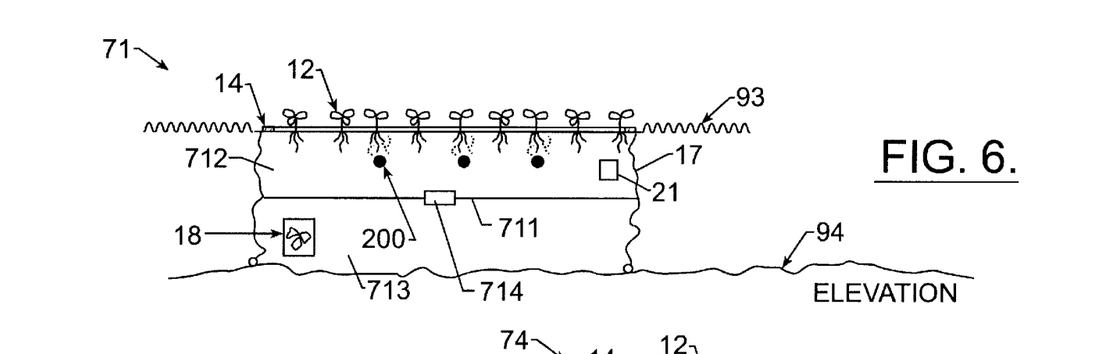
FIG. 6 is an elevation view of a vertically compartmentalized system.
Figure 7:
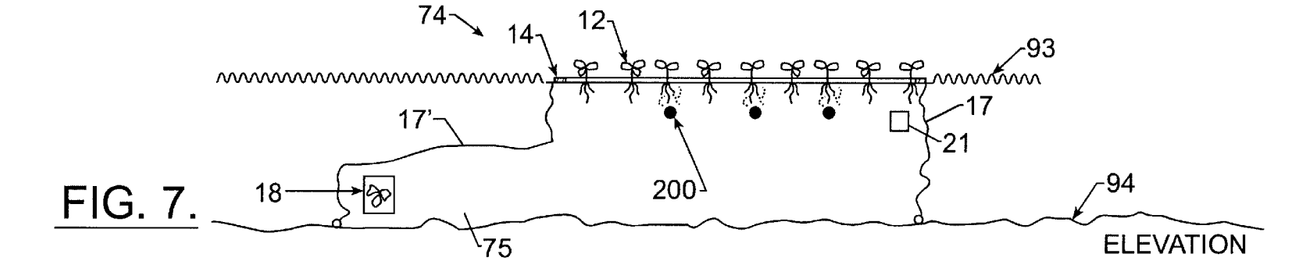
FIG. 7 is an elevation view of a compartmentalized system with one compartment outside the vegetated, shielded portion.
Figure 8:
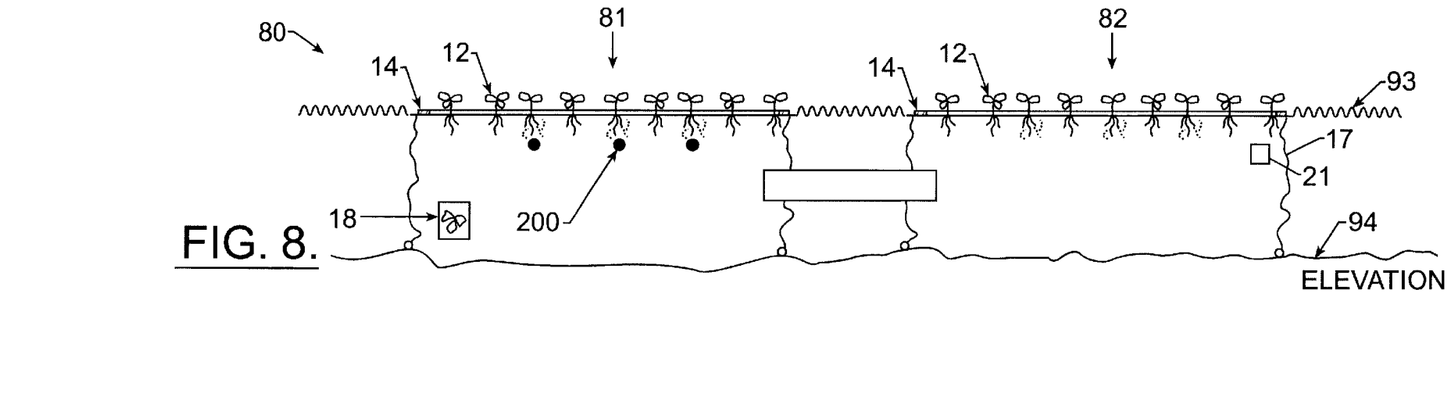
FIG. 8 is an elevation view of a system comprising two enclosures in series.

In yet further embodiments 70,71, the water column beneath the macrophytes 12 may also be subdivided into a plurality of compartments, so that water passing sequentially through the compartments is exposed to different types of treatment processes in each compartment. The compartments may be divided, for example, vertically 70 (FIGS. 5A and 5B) or horizontally 71 (FIG. 6). In the vertically divided system 70, an internal divider 701 is extended, for example, diametrically across the enclosure 14, with diffusers 200 positioned in only one 702 of the two subcompartments 702,703, and a vent 704 between the subcompartments 702,703 to permit fluid communication therebetween. In the horizontally divided system 71, the internal divider 711 is extended horizontally in spaced relation both from the floating boom 14 at the water surface 93 and the bottom 94. Again a vent 714 is provided between the top 712 and the bottom 713 subcompartments to permit fluid communication therebetween, and diffusers 200 are positioned in only one, here, the top 712, of the subcompartments.

In a related embodiment 74 (FIG. 7), for example, for use in a very shallow enclosure, the compartment volume beneath the macrophytes 12 may be too small to allow for senescence and degradation of phytoplankton. In this embodiment 74, water may be pumped through a separate underwater enclosure 75 before entering the water column 76 beneath the macrophytes 12. The additional enclosure 75 may be defined, for example, by at least a part of the barrier 17' being spread out along the bottom 94 of the body of water, creating an additional volume of enclosed water. Here the area or footprint of the underwater enclosure 75 is "decoupled" from the area or footprint of the macrophytes 12.

Another embodiment 80 (FIG. 8) comprises two or more floating mat enclosures 81,82 in fluid communication in series. In this embodiment 80 different plant types can be used for different water treatment purposes, and different management regimes can be imposed, for example, aeration 200 in only one of the enclosures 81. Additionally, the enclosures 81,82 can be situated at different water depths, to take advantage of more effective phytoplankton settling in a deeper water column, whereas denitrification likely works better with a smaller separation between the rhizosphere and the sediments.

It may be appreciated by one skilled in the art that additional embodiments may be contemplated, and that many processes may be utilized in concert to achieve water remediation, such as plant uptake and harvesting of contaminants, the transformation and stripping into the atmosphere of nitrogen, and the sequestering and/or immobilization of phosphorus by coagulants into sediment. Further, the rhizosphere biota can contribute to pathogen reduction via predation by root zone organisms.

The initial sink for contaminants sloughed off as plant detritus, such as phosphorus and heavy metals, is the sediment. Overtime, some of the contaminants will be reliberated into the water during decomposition of the debris. The sediment organic detritus is stabilized by periodic (e.g., quarterly) introduction of a chemical coagulant into the enclosure. Such coagulants may comprise, for example, aluminum, iron, or calcium salts.

In a particular embodiment, the enclosure can be moved periodically within the body of water so that the "footprint" exposed to the "sealing" and stabilization action of the coagulant can be expanded incrementally over time. A particular time for enclosure movement comprises once every 6 months, although this is not intended as a limitation.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

REFERENCES

Reddy, K. R.; Rao, P. S. C., DeBusk, W. F. "Waterhyacinth Production Systems in Nutrient Enriched Waters, Project 2161," (Sep. 13, 1983), GRI/IFAS Project Advisors Review Meeting, University of Florida, Gainesville.

Amasek, Inc., "Lake Apopka Water Hyacinth Demonstration Project, Semi-Annual Report May-October 1989," (Jan. 29, 1990), Amasek, Inc., Cocoa, Fla., prepared for St. Johns River Water Management District, Palatka, Fla.

Reddy, K. R., DeBusk, T. A., "State-of-the-Art Utilization of Aquatic Plants in Water Pollution Control," Wat. Sci. Tech. Vol. 19 No. 10 pp.61–79, 1987.

What is claimed is:

1. A method for reducing a contaminant level in a body of water comprising the steps of:

placing plants atop at least a portion of the body of water, the plants shielding water therebeneath from sunlight sufficiently to kill phytoplankton therein, the lysis thereof releasing nutrients;

permitting a microbial colonization of a rhizosphere area the plants for achieving microbially mediated contaminant removal and transformation;

physically segregating the shielded portion of the body of water to form a water column; and permitting the plants to sequester at least a portion of the released nutrients.

2. The method recited in claim 1, wherein the plants comprise a floating mat of plant material.

3. The method recited in claim 1, further comprising the steps of adding water to be treated into the water column and removing treated water from the water column.

4. The method recited in claim 3, wherein the water adding and removing steps are accomplished with the use of a solar-powered pump.

5. The method recited in claim 3, wherein the water adding and removing steps are adjustable to optimize contaminant removal.

6. The method recited in claim 5, wherein the water adding and removing steps are performed with a pump having at least one of an adjustable-depth intake and an adjustable pumping rate.

7. The method recited in claim 5, further comprising the step of adding a coagulant to the water column for removing phosphorus therefrom.

8. The method recited in claim 7, wherein the water adding and removing steps are adjusted for achieving a circumneutral pH.

9. The method recited in claim 7, wherein the coagulant comprises aluminum sulfate.

10. The method recited in claim 1, further comprising the step of aerating the water column beneath the plant rhizosphere area.

11. The method recited in claim 10, wherein the aeration step comprises adding at least one fine diffuser beneath the plant rhizosphere area.

12. The method recited in claim 10, wherein the aerating step is undertaken in alternating cycles with non-aeration.

13. The method recited in claim 1, further comprising the step of forming a plurality of compartments within the body of water, each compartment for achieving at least one treatment modality, at least one compartment formed within the water column.

14. The method recited in claim 13, wherein the plurality of compartments comprise a series of horizontally separated compartments.

15. The method recited in claim 14, further comprising the step of aerating a unitary compartment.

16. The method recited in claim 13, wherein the plurality of compartments comprise a series of vertically separated compartments.

17. The method recited in claim 16, further comprising the step of aerating a unitary compartment.

18. The method recited in claim 13, wherein at least one compartment is positioned outside the vegetated water column.

19. The method recited in claim 1, wherein the plants comprise a floating mat of plant material and the sequestering step comprises extending a flexible skirt from the floating mat downward to a bottom of the body of water.

20. The method recited in claim 19, further comprising the step of pumping water between the water column and a remaining portion of the body of water.

21. The method recited in claim 1, wherein:

the plants comprise a plurality of floating mats of plant material; and the physically segregating step comprises forming a plurality of water columns; and further comprising the step of:

transferring water to be treated between the water columns.

22. The method recited in claim 1, further comprising the step of adding a nutrient for enhancing at least one of plant growth and microbial growth.

23. The method recited in claim 1, wherein the plant placing step comprises providing a plant mat and seeding the plant mat with at least one of plant seeds and vegetative propagules of at least one desired plant species.

24. The method recited in claim 23, further comprising the step of performing periodic maintenance on the plant mat to achieve a desired plant density and species composition.

25. The method recited in claim 1, wherein the plant placing step comprises providing at least one floating wetland plant.

26. The method recited in claim 25, wherein the floating wetland plant is selected from the group consisting of Hydrocotyle, Limnobium, Eichhornia, and Scirpus.

27. The method recited in claim 1, wherein the plant placing step comprises placing plants atop a first portion of the body of water, and further comprising the step of moving the placed plants to a second portion of the body of water after a predetermined time.

* * * * *